United States Patent [19]
Packer

[11] Patent Number: 5,943,811
[45] Date of Patent: *Aug. 31, 1999

[54] AIRETAIL FISHING LURE

[76] Inventor: Raymond Packer, P.O. Box 924, Johnstown, Pa. 15907

[ * ] Notice: This patent issued on a continued prosecution application filed under 37 CFR 1.53(d), and is subject to the twenty year patent term provisions of 35 U.S.C. 154(a)(2).

[21] Appl. No.: 08/883,368

[22] Filed: Jun. 26, 1997

Related U.S. Application Data

[63] Continuation of application No. 08/437,422, May 12, 1995, abandoned.

[51] Int. Cl.[6] .................................................. A01K 85/00
[52] U.S. Cl. ......................................... 43/42.24; 43/42.06
[58] Field of Search .............................. 43/42.06, 42.24, 43/42.35

[56] References Cited

U.S. PATENT DOCUMENTS

| | | | |
|---|---|---|---|
| D. 192,510 | 4/1962 | Stembridge | 43/42.24 |
| 3,105,317 | 10/1963 | Fox | 43/42.06 |
| 3,449,853 | 6/1969 | Shearer | 43/42.24 |
| 3,724,116 | 4/1973 | Lindner | 43/42.24 |
| 3,831,307 | 8/1974 | Pittman | 43/42.24 |
| 3,965,606 | 6/1976 | Bingler | 43/42.24 |
| 3,978,606 | 9/1976 | Riggs | 43/42.24 |
| 4,167,076 | 9/1979 | Weaver | 43/42.24 |
| 4,203,246 | 5/1980 | Sacharmoski | 43/42.24 |
| 4,214,397 | 7/1980 | Kent | 43/42.35 |
| 4,841,665 | 6/1989 | McGahee | 43/42.24 |
| 4,856,223 | 8/1989 | Evans | 43/42.24 |

*Primary Examiner*—Kurt Rowan
*Attorney, Agent, or Firm*—Laubscher & Laubscher

[57] ABSTRACT

The disclosure describes a fishing lure comprised of a yielding synthetic compound in a generally cylindrical and somewhat conical shape with the elliptical arcs at the ends and at the center ring. The arcs create distinctions representative of the natural characteristics of an earthworm. From the tail to a point behind the center ring there is an internal aerosphere which creates a bouyancy of the rearward portion of the lure. The aerosphere displaces the synthetic compound used to manufacture the lure creating a difference in density between the head and tail. This allows the lures' head and tail to rest at different levels, which increases its visibility. The aerosphere additionally creates an angular wall in the lure from the outside diameter of the lure to the aerosphere. This provides a greater flexibility of the lure, therefore increasing its action in the water. The tail is open at the end which allows, when in use, the escape of very tiny air bubbles thus assimilating a natural forage for fish.

1 Claim, 1 Drawing Sheet

FIG. 1
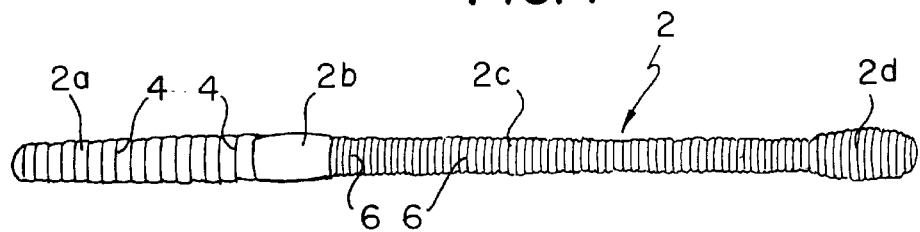
FIG. 2
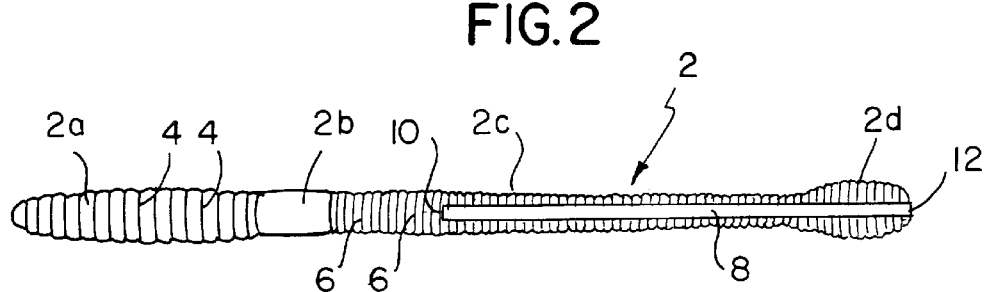
FIG. 3
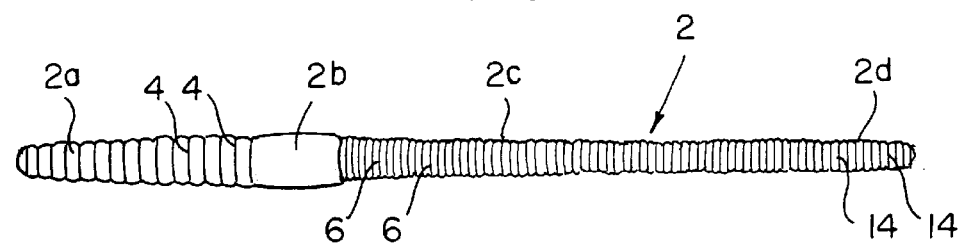
FIG. 4
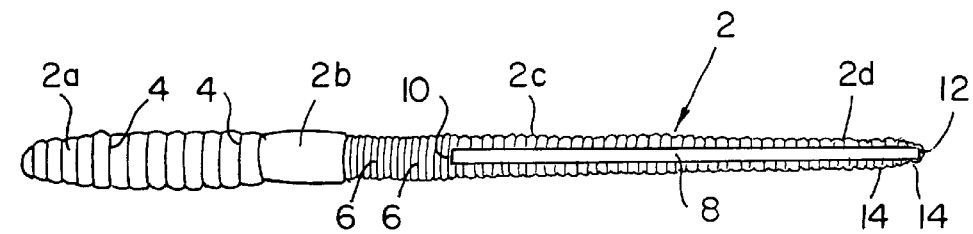
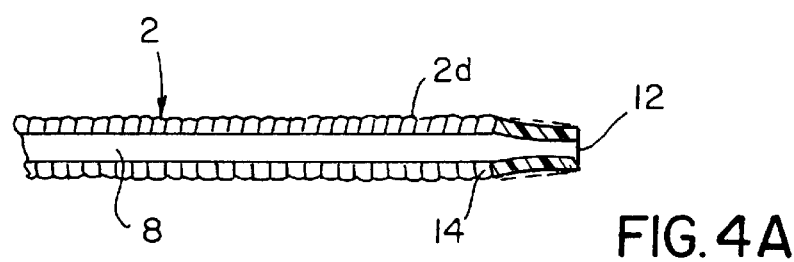
FIG. 4A

AIRETAIL FISHING LURE

This is a continuation of application of Ser. No. 08/437,422, filed May 12, 1995, now abandoned.

BACKGROUND OF THE INVENTION

The present invention is generally related to a device for sensory enticement to fish. More particularly it is concerned with a device which will increase visibility and expand the area of enticement to allow use at any depth level while maintaining its behavioral characteristics.

At the present time soft plastic lures which provide an attraction to fish generally do so through the multiple curvatures in the tail. This causes the tail to move rapidly from side to side. One device uses a flat ribbon in an "S" configuration in the tail to create turbulence in water. In operation, this device maintains a relatively consistent non-variable depth level. Another device uses a tail shaped in a circular manner. This is to provide an oscillating motion of the lure as it is pulled through the water. This device also maintains a relatively constant depth when in use. A further device is a straight, non contoured rubber sleeve with a spring steel strip through its center. Its depth can be controlled through the use of air and buckshot, however its body stays somewhat rigid due to the spring steel. This inhibits its action in the water. Soft plastic lures of present do not effectively combine action and versatility in range of depth when in use.

U.S. Pat. No. 4,592,161 dated Jun. 3, 1986 describes a device consisting of a soft plastic fishing lure with a substantially flat ribbon, "S" configuration tail. Its action is created through turbulence caused by water flowing over the tail.

U.S. Pat. No. 4,242,827 dated Jan. 6, 1981 describes a device consisting of a fishing lure made with a spring steel strip covered with a rubber sleeve. The depth at which the lure runs is controlled by buckshot and inflation by an air valve.

U.S. Pat. No. 4,316,343 dated Feb. 23, 1982 describes a device consisting of a fishing lure with a tail made into a circular pattern to create an oscillating motion when pulled through the water.

It will be realized the above mentioned devices lack versatility. Their limitations reduce the effectiveness of the lures.

To overcome the shortcomings of existing lures, the present invention was developed to provide a lure which has a greater visibility while maintaining an action that assimilates a natural bait. This device has features which allow it to be used at varying depths of water in positions concurrent with the fish. This device has an increased flexibility, which creates greater action in the lure.

SUMMARY OF THE INVENTION

It is the object of the current invention to afford a device which allows multiple depths of fishing for the purpose of increasing the visibility and the action of the device while maintaining the representation of a natural bait.

This object can be accomplished through the use of a yielding synthetic compound in a generally cylindrical and somewhat conical shape with elliptical arcs and an aerosphere to vary the density from the head and tail, thereby providing bouyancy. The tail is open at the end thus allowing the escape of very tiny air bubbles when in use. These characteristics increase the lures' visibility and action representative of a natural forage for fish.

BRIEF DESCRIPTION OF THE DRAWINGS

The following drawings will provide an illustration of the invention:

FIG. 1 is a topview of the lure lying on a horizontal plane.

FIG. 2 is the same view as FIG. 1 with the internal aerosphere shown.

FIG. 3 is a sideview of the lure lying on a horizontal plane.

FIG. 4 is the same view as FIG. 3 with the internal aerosphere shown.

DETAILED DESCRIPTION OF THE DRAWINGS

Referring to FIGS. 1–4, there is shown a fishing lure 2 in the form of an earthworm. The lure is formed integrally from a single piece of a suitable yielding synthetic material. The lure includes an elongated generally cylindrical head portion 2a having an outer surface containing a plurality of speed elliptical arcs or circumferential grooves 4. A generally cylindrical ring portion 2b is arranged adjacent the head portion 2a. The ring portion 2b has a smooth outer surface and a diameter which is greater than the diameter of the head portion 2a. An elongated generally conical body portion 2c is arranged adjacent the ring portion 2b and a flat tail portion 2d is arranged adjacent the body portion 2c. The outer surface of the body portion 2c and tail portion 2d contains a plurality of spaced elliptical arcs or circumferential grooves 6 similar to grooves 4. However, the distance between grooves 6 is less than the distance between grooves 4. The object of the grooves is to provide the maximum surface area across the body 2c and tail 2d portions, thereby to create the greatest resistance when the lure is moved through water while maintaining the symmetry of the lure.

An internal aerosphere 8 extends longitudinally through the body portion 2c beginning at a point 10 located behind the ring portion 2b and further extends through the tail portion 2d to an outlet hole 12 contained in the end of the tail portion. The aerosphere is defined by a smooth walled bore and serves as a pneumatic compartment which creates buoyancy in the rearward body portion and tail portion of the lure. Consequently, the head portion 2a of the lure has a greater density than the rearward end of the lure, thereby allowing the head portion and tail portion to rest at different levels when submerged in water.

Between the outside surface of the lure and the aerosphere 8, an annular wall is created. This annular wall provides the lure with increased flexibility which increases the lure's action. The solid head portion 2a and ring portion 2b of the lure provide sufficient substance for insertion of a fishhook.

Elliptical arcs 14 shown in FIGS. 3 and 4 are provided on the sides of the tail portion and serve to symmetrically taper the tail portion 2d. This provides, at the end of the tail portion 2d, a thinner wall in the yielding synthetic compound surrounding the aerosphere effecting a partial collapse of the end of the aerosphere. The outlet hole 12 provided at the end of the tail permits the escape of very tiny air bubbles when the lure is moved through the water, thereby simulating a natural forage for fish. The aerosphere, in combination with the higher density head portion, provides the lure with increased movement, action, and visibility, thereby greatly enhancing sensory enticement to fish.

I claim:

1. A worm-shaped fishing lure, comprising:
    a unitary generally-linear symmetrical lure body formed of flexible synthetic plastic material, said lure body including:
    (a) a head end portion (2a), a tail end portion (2d) having an extremity, an intermediate ring portion (2b) arranged between said head and tail end portions, and a conical portion (2c) arranged between said intermediate ring portion and said tail end portion, said tail end portion being flattened;
(b) said head end portion (2a) being solid and having a generally conical outer surface that converges in the direction of said intermediate ring portion;
(c) said conical portion (2c) having a conical outer surface that converges in the direction of said tail end portion;
(d) said tail end portion and the adjacent portion of said conical portion containing a longitudinal bore (8) having an opening (12) contained in the extremity of said flattened tail end portion.
  (1) said longitudinal bore extending from said opening through said tail end portion and partially within said conical portion, said bore having a smooth inner surface free of projections throughout its length and terminating in spaced relation to said intermediate portion;
  (2) said flattened tail end portion adjacent said opening having a thinner wall thickness for effecting partial collapse of said opening;
(e) said intermediate ring portion (2b) being solid and having a smooth outer surface;
(f) said head end portion, said conical portion and said tail end portion each containing on its outer surface a plurality of longitudinally spaced concentric grooves (4; 6; 14) that define therebetween a plurality of external elliptical ribs, whereby when a fishing hook is attached to said lure body head end portion, said tail end portion will have a greater buoyancy and elevation than said head end portion, thereby to permit the escape of air bubbles from said bore via said partially collapsed bore opening contained in said flattened tail end portion.

\* \* \* \* \*